Patented Sept. 14, 1937

2,092,889

UNITED STATES PATENT OFFICE 2,092,889

DRYING OIL

Louis A. Mikeska and Anthony H. Gleason, Elizabeth, N. J., assignors to Standard Oil Development Company, a corporation of Delaware No Drawing. Application October 19, 1934, Serial No. 749,071

7 Claims. (Cl. 134—56)

This invention relates to improved methods for the preparation of drying oils and to the products obtained thereby, and more particularly to the preparation of drying oils from unsaturated hydrocarbons and mixtures thereof.

Drying oils may be produced by limited polymerization and condensation of relatively lower boiling unsaturated hydrocarbons such as the olefines, di-olefines, aryl substituted olefines such as styrene and mixtures containing one or more of such classes of unsaturated compounds such as cracked petroleum naphthas, coal tar naphthas, gas drips and the like. Suitable cracked products for this invention are the low boiling and the normally gaseous products containing unsaturated hydrocarbons, obtained by cracking, destructive distillation, destructive hydrogenation and dehydrogenation, and liquefaction, of carbonaceous materials such as coal, lignite, peat, mineral oils, petroleum, and fractions of such materials obtained by liquefaction, distillation, extraction or other suitable means either before or after the cracking or other destructive treatment. Particularly desirable drying oils are obtained when the materials subjected to the polymerizing treatment contain di-olefines or aryl substituted olefines.

The polymerization reaction is preferably conducted at a low temperature below about 60 to 100° F. and is preferably conducted at temperatures below about 0 to —40° F. and even as low as —100° F. The reaction is preferably conducted in the presence of boron fluoride, although other polymerization catalysts may be used in certain cases. Among such condensing agents are titanium tetrachloride, tin tetrachloride, phosphorous trichloride, antimony trichloride, antimony trifluoride, aluminum chloride and the like. Condensing agents which are solid under the conditions of reaction should be supplied in an extremely finely divided form or else dissolved in a suitable solvent.

The invention has been found particularly applicable to the preparation of drying oils from highly cracked petroleum naphthas such as those produced by cracking gas oils in vapor phase at temperatures above 900, 1000 or 1150° F. or higher.

The following example is presented to illustrate one modification of the present invention:

A gasoline, boiling up to 400° F., obtained by cracking a petroleum gas oil in vapor phase at a temperature of about 1050° F. and containing olefin and di-olefin hydrocarbons, was cooled to —70° F. Boron fluoride was bubbled through the mixture continuously for about 15 minutes, until no further thickening of the gasoline was noticeable. The oily reaction product was then permitted to warm up to room temperature, was washed with water and was distilled to a 400° F. end point. The viscous oil residue amounted to 40% of the original charge. This material may be used as such for drying oil purposes.

This product was then further distilled to a 400° F. end point at 2 mm. absolute pressure of mercury, leaving a 30% residue (based on the original charge) consisting of an amber colored very viscous oil. The overhead was a light oil suitable for lubricating purposes. After dissolving the residue in benzol and precipitating with acetone, about half of the material was precipitated out as a resinous mass which was a powdery brittle solid polymerization product of high molecular weight. This product is suitable for use in the preparation of plastics, coating compositions and for other uses to which resins are generally put. The remaining half of the product present in the benzol served as a valuable drying oil either as such, alone, or upon removal of the benzol and admixture with other compounding agents such as linseed oil, pigments, turpentine driers, and the like. Thin films of this oil hardened rapidly on exposure to the air to produce a transparent light amber colored hard and tough film suitable for use as a surface coating.

Both the drying oil and the resin obtained above were blended in a Coastal oil, and the following viscosity characteristics were observed:

|  | Coastal oil | +10% resin | +10% oil |
|---|---|---|---|
| Vis. at 100° F | 360 | 655 | 627 |
| Vis. at 210° F | 50 | 62.2 | 58 |
| Vis. index | 38 | 52 | 35 |

It will be noted that the viscosity index of the Coastal oil was considerably improved by the addition of the resinous product. These products may be added to mineral oils, lubricants, vegetable oils, synthetic oils, greases, fuels and the like, to improve their properties.

The ability of the resin to improve lubricating oils to which it is added may be greatly increased by hydrogenating the resin either separately or in admixture with the oils to which it is to be added. The hydrogenation also increases the solubility of the resin in oils of high viscosity index, such as Pennsylvania lubricating oils.

The oil fraction may be used as a lubricant and preferably after hydrogenation to remove its drying properties and to render it more stable, to thicken lubricating oils in cases where an increase in viscosity index is not desired. It may also be hydrogenated to remove its drying properties, to render it more stable, and to produce an improved lubricating oil of high viscosity index.

While the above example illustrates the preparation of a drying oil from a cracked gasoline fraction, the process may be applied generally to similarly cracked oils boiling from about 70° F. up to about 500° F. The cracked fractions boiling between about 100 and 300° F. are especially suited for the preparation of high quality drying oils.

Where the cracked oils have been allowed to stand for long periods of time, or have otherwise become discolored by a content of gummy or asphaltic matter, it is desirable to redistill the oils, or to subject them to a mild purification insufficient to remove substantial amounts of unsaturated hydrocarbons, such as filtration, or treatment with small amounts of decolorizing clay or sulfuric acid, in order to obtain drying oils of light color and high quality.

These drying oils may be used alone or in combination with vegetable or marine drying oils, and with the volatile solvents and diluents, resins, plasticizers, pigments, fillers, dyes and the like customarily used with ordinary drying oils in the preparation of paints and varnishes.

This invention is not to be limited to any specific examples or explanations which are presented herein solely for purpose of illustration, but is broadly applicable and is to be limited only by the following claims in which it is desired to claim all novelty insofar as the prior art permits.

We claim:
1. Process for preparing a drying oil comprising contacting a mixture of cracked hydrocarbons, boiling below about 400° F. and containing olefins and di-olefins, at a temperature below about 100° F. with an active halide polymerizing agent and separating benzol soluble, acetone soluble oil liquid at about 400° F. at 2 mm. pressure and having drying properties from the resulting products.

2. Process according to claim 1 in which said polymerizing agent is boron fluoride.

3. Process according to claim 1 in which said reaction temperature is below about 0° F.

4. Process according to claim 1 in which said mixture of hydrocarbons is a naphtha obtained by cracking a petroleum gas oil in vapor phase.

5. Process according to claim 1 in which said mixture of hydrocarbons is a naphtha obtained by cracking a petroleum gas oil at a temperature of about 1000 to 1150° F.

6. A hydrocarbon oil having drying characteristics, soluble in benzol and in acetone, liquid at 400° F. at 2 mm. pressure, and separated from the products obtained by polymerizing an unsaturated hydrocarbon by contact with an active halide polymerizing agent at a temperature below about 100° F.

7. A hydrocarbon oil having drying characteristics, soluble in benzol and in acetone, liquid at about 400° F. at 2 mm. pressure, and separated from the products obtained by polymerizing a naphtha, obtained by cracking a petroleum gas oil at a temperature of about 1000 to 1150°'F., by contact with boron fluoride at a temperature below about 0° F.

LOUIS A. MIKESKA.
ANTHONY H. GLEASON.